United States Patent [19]
Lehman

[11] Patent Number: 5,628,633
[45] Date of Patent: May 13, 1997

[54] TRAINING MANIKIN

[75] Inventor: Joseph M. Lehman, Columbus, Ohio

[73] Assignee: Zevco Inc., Northbrook, Ill.

[21] Appl. No.: 685,928

[22] Filed: Jul. 25, 1996

[51] Int. Cl.$^6$ .............................. G09B 23/32; G09B 23/34
[52] U.S. Cl. ........................................................ 434/265
[58] Field of Search .................................. 434/262, 267, 434/265

[56] References Cited

U.S. PATENT DOCUMENTS

| | | | |
|---|---|---|---|
| 2,774,184 | 12/1956 | Hefferan et al. | 434/267 |
| 3,994,075 | 11/1976 | Kohnke | 435/265 |
| 4,194,303 | 3/1980 | Heller | 434/267 |
| 5,055,052 | 10/1991 | Johnsen | 434/267 |
| 5,195,896 | 3/1993 | Sweeney et al. | 434/265 |
| 5,238,409 | 8/1993 | Brelt et al. | 434/267 |
| 5,295,835 | 3/1994 | Schienberg et al. | 434/265 |
| 5,312,259 | 5/1994 | Flynn | 434/267 |
| 5,330,514 | 7/1994 | Egelandsdal et al. | 435/265 |

*Primary Examiner*—Paul J. Hirsch
*Attorney, Agent, or Firm*—Thomas S. Baker, Jr.

[57] ABSTRACT

A training manikin for use in connection with cardiopulmonary resuscitation procedure training is provided with an airway tube element insert that is automatically folded to restrict the flow of air from a mouth/nose element insert unless the manikin head face and chin with included mouth/nose element insert is initially properly pivoted to clear the airway tube element for the passage of air.

4 Claims, 2 Drawing Sheets

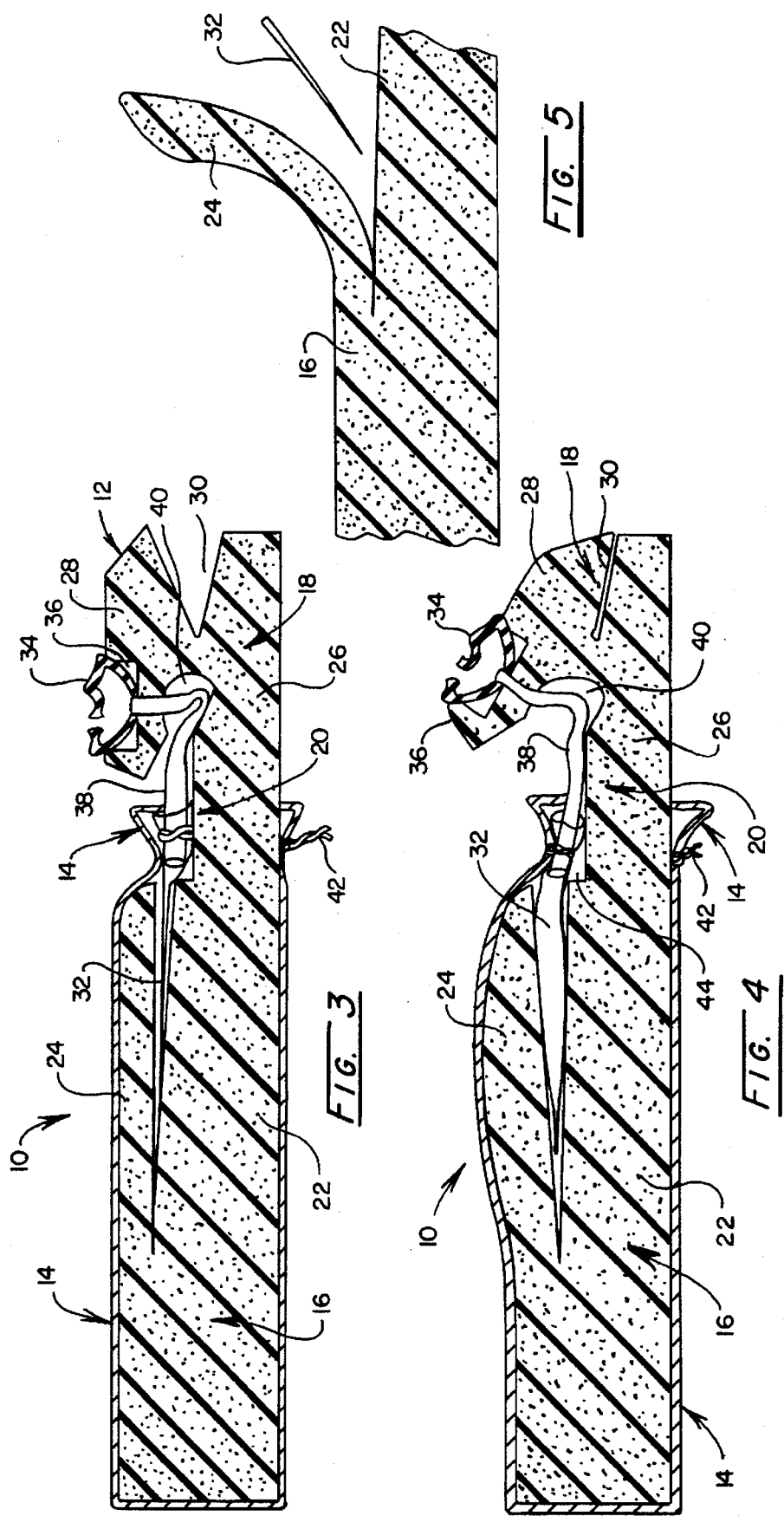

TRAINING MANIKIN

CROSS-REFERENCES

None.

FIELD OF THE INVENTION

This invention relates generally to manikins, and particularly concerns a manikin which may be utilized advantageously in connection with training exercises for the development of cardio-pulmonary resuscitation (CPR) emergency skills.

BACKGROUND OF THE INVENTION

Numerous different manikins are manufactured and made publicly available for use in training programs for various medical and emergency personnel to develop a wide variety of professional and semi-professional skills, including cardio-pulmonary resuscitation emergency skills. In the case of cardio-pulmonary resuscitation training it is generally desired that the manikin being utilized have a realistic resistance to chest compression, that lung inflation be accomplished only with the manikin head and chin in a properly tilted condition, and that the mouth/nose insert, air passageway, and inflatable lung elements incorporated into the CPR manikin be readily accessible and removable for replacement to eliminate disease cross-contamination between successive trainees.

I have discovered a new construction for a CPR training manikin that permits each of the foregoing objectives to be readily realized and with a lower cost of manufacture than has been obtained with the presently available CPR training manikins.

Other objects and advantages of this invention will become apparent from a full consideration of the summary, drawings, detailed description, and claims which follow.

SUMMARY OF THE INVENTION

To advantageously realize the objects of the present invention I provide a basic manikin body having joined torso, neck, and head sections that are preferably integrally molded of a conventional yieldable foamed polyurethane material. The torso section has a torso chest sub-section that is hingedly connected to a torso back sub-section in the region of the torso lower extreme by the integrally-molded yieldable polyurethane foam material. A removable and inflatable lung bag element is positioned between and yieldably contained by the torso chest and back sub-sections.

The manikin body integral head section is molded to have a head face and chin sub-section with a cavity and opening that receives a standard removable manikin mouth/nose insert and connected flexible air tube, and to have a head back sub-section that is hingedly joined to the head face and chin sub-section by the integrally-molded yieldable polyurethane foam material. Also, the manikin body head section is provided with a pate notch element which facilitates proper face and chin sub-section manual tilting movement relative to the head back sub-section.

The manikin body neck section integrally joins the body torso back sub-section to the body head back sub-section and contains an elongated cavity that receives a flexible air tube which connects the inflatable lung bag to the mouth/nose insert. The neck section elongated cavity extends to a "folding" cavity that is provided in the region of joinder of the body head section to the body neck section. Basically, the air tube is in a folded condition which substantially blocks the forced flow of air through the tube when the head section is in its normal non-tilted or un-stressed condition, and is in an open condition which facilitates the forced flow of air through the tube when the head face and chin sub-section is manually pivoted by the using trainee relative to the head back sub-section to the proper degree readily permitted by the head section pate notch element.

Lastly, I provide the manikin body with a readily-removable and replaceable, close fitting, plastic (e.g., polyethylene film) torso bag sub-assembly that realistically restricts displacement of the torso chest and torso back sub-sections relative to each other when the lung bag element is inflated or compressed by the using trainee. A draw-string closure is provided for the torso bag subassembly and such assists, when drawn to a closed condition, in retaining the air tube element in its proper position in the manikin neck section elongated cavity.

DESCRIPTION OF THE DRAWINGS

FIG. 3 is a sectioned elevation view taken at line 3—3 of FIG. 2 with the training manikin in a non-stressed or non-inflated condition;

FIG. 4 is a sectioned view similar to FIG. 3 but illustrating the training manikin in a stressed or inflated condition with the manikin body head face and chin sub-section properly tilted relative to the body head back sub-section; and FIG. 5 is a partial sectioned view similar to FIG. 4 but illustrating the pivoting of the manikin body torso chest and back sub-sections relative to each other during lung bag replacement.

DETAILED DESCRIPTION

Figure 1:
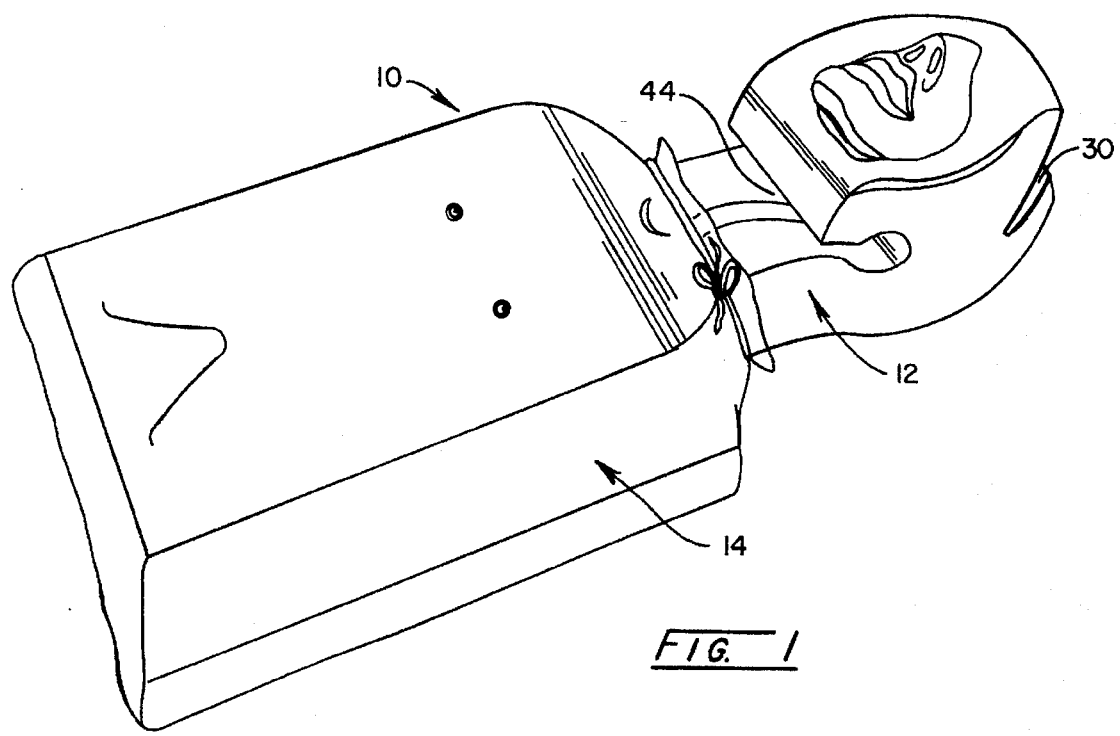
FIG. 1 is a perspective view of a preferred embodiment of the training manikin of the present invention.
Figure 2:
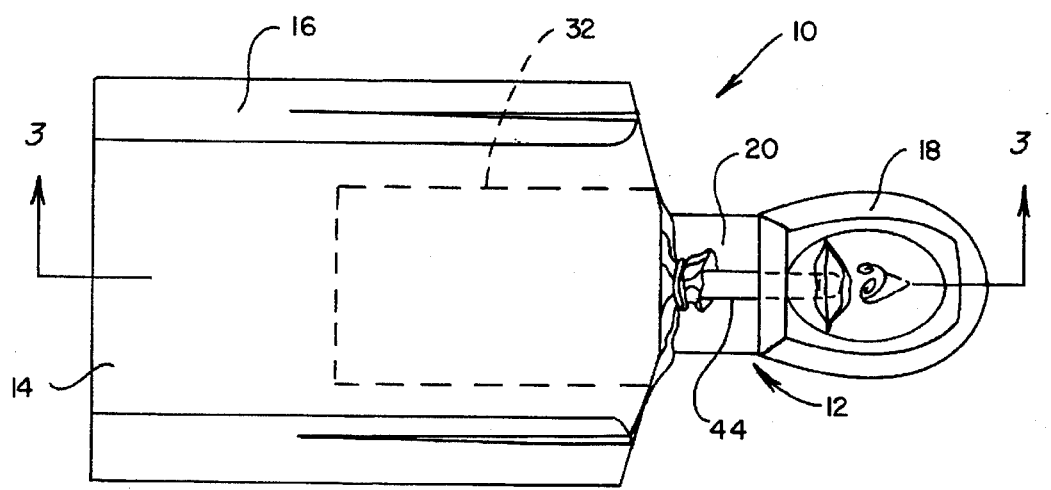
FIG. 2 is a plan view of the training manikin of FIG. 1.

The FIG. 1 illustration of the drawings depicts the training manikin 10 of the present invention in a fully-assembled preferred embodiment. Manikin 10, when properly assembled for use by a CPR procedure trainee, is basically comprised of a manikin body 12 with inserts and a readily removable, close-fitting, compliant film bag enclosure 14 that serves to prevent unwanted expansion of the torso portion of the body during training use. Manikin body preferably is molded of a conventional foamed polyurethane material of desired density and resiliency, and is comprised of a torso section 16, a head section 18, and a neck section 20 that integrally joins the head section to the torso section.

Torso section 16 is comprised of a lower (see FIGS. 3 and 4) or back sub-section 22 and an integrally joined upper or chest sub-section 24 that is, in effect, hingedly connected to torso back sub-section 22 by the resiliency of the interconnecting foamed polyurethane. See also FIG. 5. Similarly, torso head section 18 is comprised of an lower (see FIG. 3) or back sub-section 26 and an integrally joined upper or face and chin sub-section 28 that is, in effect, hingedly connected to the back sub-section 26 also by the resiliency of the interconnecting body foamed polyurethane. A pate notch element 30 is molded into manikin body head section 18 to both ease and yet limit the degree of pivoting of face and chin sub-section 28 relative to back sub-section 26 to a proper amount of manual rotation by the CPR procedure trainee using training manikin 10.

Several removable and replaceable insert elements are also incorporated into manikin 10. More specifically, assembly includes a replaceable and expandable lung bag element 32 that is inserted into manikin body 12 so as to be positioned intermediate torso back sub-section 22 and torso chest sub-section 24, a conventional replaceable mouth/nose insert element 34 that is inserted in a cavity 36 provided in head face and chin sub-section 28, and a flexible air passageway or tube element 38 that functionally connects mouth/nose insert element 34 to lung bag element 32.

It is important that manikin body 12 be molded to have a cavity 40 located in the region of the joinder of head section 18 to neck section 20. To this end a fold cavity 40 is provided in the region of the juncture of body head section 18 with body neck section 20, cavity 40 receives a portion of air tube element 38, and permits air tube element 38 to be folded to a condition that blocks the flow of air from mouth/nose insert 34 to lung bag insert 32 when manikin body head face and chin sub-section 28 is in its natural or non-tilted condition. However, air passageway or tube 38 becomes "unblocked" when the manikin user manually tilts or pivots head face and chin sub-section 28 to its proper airway-clearing position relative to head back sub-section 26. Proper sizing of head pate notch element 30 eases the manual movement of head face and chin sub-section 28 and also in effect creates more resistance to tilting when sub-section 28 has been rotated a proper amount. When properly tilted, the manikin user can more easily breath air through mouth/nose insert 34 and into lung bag 32.

FIG. 5 discloses a degree to which torso chest sub-section 24 may be typically pivoted relative to torso back sub-section 22 to facilitate insertion or removal and replacement of lung bag insert 32 into manikin body 12. For such purposes, the close-fitting and readily-replaceable torso bag enclosure 14 must first be removed from surrounding manikin body torso section 16. A conventional draw-string closure 42 is provided in bag 14 to facilitate its proper retention on body torso section 16. The draw-string closure also aids in retaining airway tube 38 in position in an elongated cavity 44 (see FIG. 1) molded in the upper surface of body neck section Various changes may be made with respect to the shape, size, and materials of construction herein detailed without departing from the scope of my invention as claimed.

I claim my invention as follows:

1. In a training manikin for use in cardio-pulmonary resuscitation procedure training, in combination:

a manikin body molded of a resilient material and comprised of integrally joined torso, neck, and head sections;

a torso back sub-section and a joined torso chest sub-section comprising said manikin body torso section;

a head face and chin sub-section and a joined head back sub-section comprising said manikin body head section;

and interconnected lung bag element, airway tube element, and mouth/nose element inserts co-operating with said manikin body torso, neck, and head sections, said head face and chin sub-section being pivotally connected to said head back sub-section by the resiliency of said manikin body resilient material, and said airway tube element insert being folded and restricting the flow of air from said mouth/nose element insert to said lung bag element insert when said head face and chin sub-section is in a non-pivoted condition and being un-folded and permitting the flow of air from said mouth/nose element insert to said lung bag insert when said head face and chin sub-section is in a fully-pivoted condition.

2. The training manikin invention defined by claim 1 wherein said manikin body head section is provided with an integrally-molded pate notch element, said pate notch element restricting further pivotal movement of said head face and chin sub-section relative to said head back sub-section when said head face and chin sub-section is manually moved to a position clearing said airway tube element insert for the flow of air from said mouth/nose element insert to said lung bag element insert.

3. The training manikin invention defined by claim 1 wherein said manikin body is provided with a molded fold cavity in the region of the junction of said manikin body head section and said manikin body neck section, said training manikin airway tube element insert being partially located within said manikin body fold cavity.

4. The training manikin invention defined by claim 1 and further comprised of a readily-removable and closely-fitted, torso bag element substantially surrounding said manikin body torso section, said readily-removable and closely-fitted torso bag element restricting the outward expansion of said manikin body torso chest sub-section when air is flowed under pressure from said manikin mouth/nose element insert to said manikin lung bag element insert.

\* \* \* \* \*